United States Patent [19]

Johnson

[11] 4,336,133

[45] Jun. 22, 1982

[54] ETHYLENE GLYCOL ANTIFREEZE REPURIFICATION APPARATUS

[76] Inventor: Robert C. Johnson, 808 N. Powell Rd., Essexville, Mich. 48732

[21] Appl. No.: 210,400

[22] Filed: Nov. 25, 1980

[51] Int. Cl.³ .............................................. B01D 21/02
[52] U.S. Cl. .................................... 210/95; 210/532.1
[58] Field of Search .................. 73/440, 306; 210/800, 210/95, 96.1, 103, 104, 121, 513, 519, 532.1, 86

[56] References Cited

U.S. PATENT DOCUMENTS

| 365,259 | 6/1887 | Ide | 210/95 |
| 3,626,763 | 12/1971 | White | 73/440 |
| 4,126,044 | 11/1978 | Tichy et al. | 73/440 |

Primary Examiner—Ivars C. Cintins

[57] ABSTRACT

A vessel into which previously used, dirtied ethylene glycol type antifreeze may be entered to be purified by sedimentation. After sedimentation is essentially completed and the antifreeze appears clear to the human eye, it may be drawn off by means of a side spigot without disrupting the sediment which has collected at the bottom. The apparatus further serves to register the degree of freeze protection of the antifreeze contained therein and serves as a storage container for the antifreeze until transferred.

2 Claims, 2 Drawing Figures

SECTION A-A

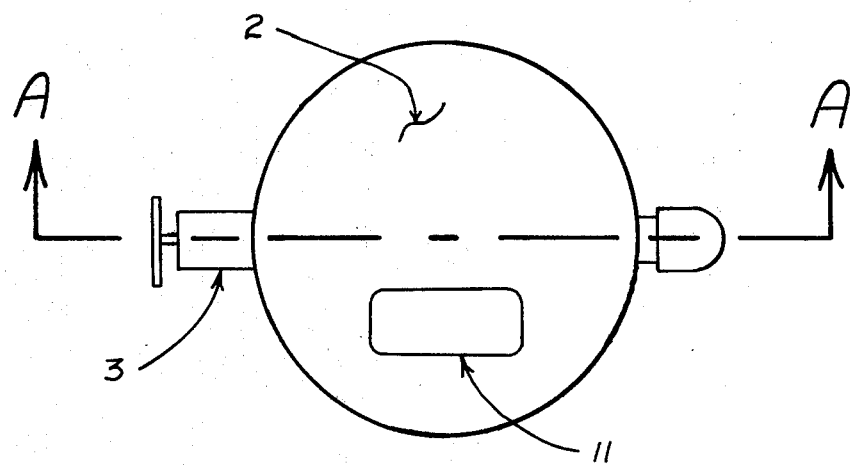
FIG. 1
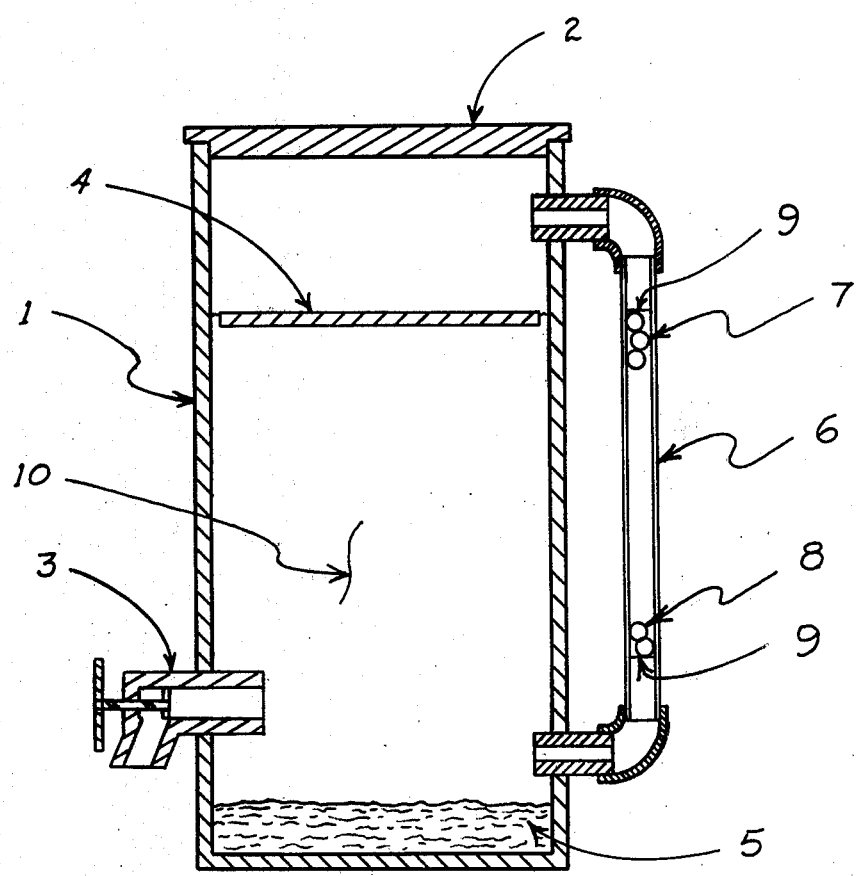
FIG. 2 SECTION A-A

ETHYLENE GLYCOL ANTIFREEZE REPURIFICATION APPARATUS

SUMMARY OF THE INVENTION

The invention relates to the use of a vessel with ports and appendages positioned in such a manner as to make it useful in purifying and dispensing previously used ethylene glycol type antifreeze.

Previously common practice has been to discard ethylene glycol antifreeze when removing it from a vehicle radiator because of the contaminators contained therein. Often said contaminators do little more than cloud the product causing the user to feel that it should be discarded and replaced by fresh transparent antifreeze.

Present attempts to purify ethylene glycol antifreeze by sedimentation in vessels which are not specifically designed for that purpose results in the sediment re-entering the purified product. This is particularly true when previously used antifreeze is returned to the jug type container in which it was originally dispensed. When one attempts to pour off the clear product after sedimentation, the sediment is stirred up only to re-enter the product. This problem is also present when using presently available side spigot vessels. These containers are designed to draw off the maximum amount of liquid by positioning the spigot very near the bottom. When used for antifreeze sedimentation, the sediment near the spigot is stirred up and carried out the spigot to re-enter the product from which it had separated.

Vessels which are not specifically designed for ethylene glycol antifreeze sedimentation also lack labor saving features which are inexpensive to build into the vessel, but provide convenience during the process of purification.

There is a particular need for a vessel which has been specifically designed for the purification of ethylene glycol type antifreeze by sedimentation. The need also exists for this vessel to be specifically designed for mixing of purified antifreeze with fresh antifreeze. Further the need exists for this vessel to be specifically designed to store and dispense the product.

It is a principal object of the invention to provide an improved vessel into which previously used ethylene glycol antifreeze can be deposited to be purified by the process of sedimentation. Said vessel being specifically designed so as to not disturb the sediment at the time of product removal. This is accomplished by affixing a spigot in an abnormal position approximately three inches above the bottom of the vessel thereby creating a sedimentation sump of near equal depth. Whereas this vessel is intended solely for the purposes of purifying, mixing, and dispensing ethylene glycol antifreeze, the undrained product in the sump is not lost but remains from batch to batch. Only when the sediment has accumulated in the sump to a depth approaching the spigot is it necessary to totally empty the vessel and lose some product.

It is another object of the invention to provide an improved vessel in which the purified antifreeze can be mixed with fresh antifreeze to raise the level of freeze protection, or in which the purified antifreeze can be mixed with water to lower the level of freeze protection.

It is still another object of the invention to provide an improved vessel in which the purified and/or mixed antifreeze can conveniently be stored until such time as it is returned to a vehicle radiator.

Referring to the drawings:

FIG. 1 is a top view of the vessel.

FIG. 2 is a sectioned view taken along line A—A of FIG. 1, and showing the vessel filled with previously used ethylene glycol antifreeze.

Referring to the drawings, the invention is comprised of a vessel 1 which may be cylindrical, rectangular, or conical in shape. Previously used ethylene glycol antifreeze 10 is poured into the container, after removing the lid 2, and the level of fluid is indicated in the transparent view tube 6. At this point the user may determine the level of freeze protection offered in the previously used antifreeze by viewing the number of varied density indicator balls 7 that have risen to the top of the fluid level in the transparent view tube 6 and by finding the corresponding protection rating on a printed, gummed label 11 affixed to the outer surface of the lid 2 of the container. Those varied density indicator balls 8 that are more dense than the antifreeze mixture will collect at the bottom of the transparent view tube 6. Both floating and immersed indicator balls are prevented from entering the body of the vessel by screens 9 located within the tube. At this point the user may chose to add fresh ethylene glycol antifreeze or water to affect the level of freeze protection desired.

After the mixture has been allowed to stand undisturbed for several days (a length of time determined by numerous factors including temperature, ethylene glycol/water proportions, type and quantity of contaminators) a major portion of the visable contaminators will collect as sediment 5 in the sump at the bottom of the vessel, rendering the antifreeze transparent when viewed by the human eye. At this point the user may choose to draw off the reclaimed antifreeze via the spigot 3 located sufficiently high on the side of the vessel to create a sediment sump.

The user may choose to leave the reclaimed antifreeze in the vessel and use said vessel as a storage and dispensing container. The user may also from time to time add additional previously used ethylene glycol antifreeze by pouring it on the floating cover 4. While the additional previously used antifreeze is being added the floating cover 4 prevents turbulence within the vessel from reaching to the bottom of the sump and stirring up the sedimentation.

It is to be understood that the invention is not to be limited to the specific arrangement of apparatus as shown and described, but that the parts may be modified within the spectrum of the claims.

What is claimed:

1. An apparatus for purifying and dispensing previously used ethylene glycol antifreeze comprising:

a vessel for receiving and purifying by sedimentation previously used ethylene glycol antifreeze;

sump means located at the bottom of said vessel for collecting sediment from said previously used antifreeze;

a spigot located above said sump means for dispensing thus purified antifreeze;

a transparent view tube affixed to and in fluid communication with said vessel, said view tube indicating the level of fluid in said vessel;

a plurality of varied density indicator balls located within said transparent view tube, said indicator balls being capable of indicating the level of freeze protection of antifreeze in said vessel; and screen means located within said view tube for preventing the indicator balls from entering the vessel.

2. The apparatus of claim 1, further including a cover means constructed and arranged to float on ethylene glycol antifreeze contained within said vessel, said cover means also serving to prevent turbulence within said vessel during the addition of further quantities of used antifreeze to said vessel.

* * * * *